US010565650B2

(12) United States Patent
Jomppanen et al.

(10) Patent No.: US 10,565,650 B2
(45) Date of Patent: Feb. 18, 2020

(54) CONTENT SELECTION FOR MOBILE DEVICE (71) Applicant: OP-PALVELUT OY, Helsinki (FI)

(72) Inventors: Tuomas Jomppanen, Helsinki (FI); Jussi Juntunen, Helsinki (FI)

(73) Assignee: OP-PALVELUT OY, Helsinki (FI)

( * ) Notice: Subject to any disclaimer, the term of this patent is extended or adjusted under 35 U.S.C. 154(b) by 367 days.

(21) Appl. No.: 15/125,795

(22) PCT Filed: Mar. 4, 2015

(86) PCT No.: PCT/FI2015/050134
§ 371 (c)(1),
(2) Date: Sep. 13, 2016

(87) PCT Pub. No.: WO2015/136149
PCT Pub. Date: Sep. 17, 2015

(65) Prior Publication Data
US 2017/0024815 A1    Jan. 26, 2017

(30) Foreign Application Priority Data
Mar. 13, 2014  (FI) ..................... 20145233

(51) Int. Cl.
G06Q 40/04    (2012.01)
G06Q 40/02    (2012.01)
(Continued)

(52) U.S. Cl.
CPC ........... G06Q 40/04 (2013.01); G06Q 10/109 (2013.01); G06Q 30/02 (2013.01); G06Q 40/02 (2013.01)

(58) Field of Classification Search
CPC ..................................... G06Q 40/00
(Continued)

(56) References Cited
U.S. PATENT DOCUMENTS 6,049,778 A * 4/2000 Walker ............... G06Q 30/02
705/14.14
7,836,006 B2  11/2010 Kobayashi et al.
(Continued)

FOREIGN PATENT DOCUMENTS
WO    2011/119974 A1    9/2011

OTHER PUBLICATIONS
Finnish Office Action dated Sep. 26, 2014; Application No. 20145233.
(Continued)

Primary Examiner — Kirsten S Apple
(74) Attorney, Agent, or Firm — Young & Thompson (57) ABSTRACT Content selection for a mobile device. An apparatus obtains classified weekly consumption data of a consumer, calculates for each consumption class a relative daily value for each day of the week, calculates for each consumption class a content relevance probability in a selected day of the week on the basis of a relative daily value of the selected day of the week affected by a relative daily value of at least one day following the selected day of the week, controls a content selection for the consumer on the selected day of the week on the basis of the calculated content relevance probabilities for the selected day, and transmits the selected content to a mobile device of the consumer on the selected day.

12 Claims, 5 Drawing Sheets (51) Int. Cl.
  *G06Q 30/02* (2012.01)
  *G06Q 10/10* (2012.01)
(58) Field of Classification Search
  USPC .......................................................... 705/35
  See application file for complete search history.

(56) References Cited

U.S. PATENT DOCUMENTS

| | | |
|---|---|---|
| 2004/0073924 A1 | 4/2004 | Pendakur |
| 2005/0197954 A1* | 9/2005 | Maitland ............ G06Q 10/0631 705/39 |
| 2007/0094082 A1* | 4/2007 | Yruski .................. G06Q 30/02 705/14.56 |
| 2007/0027114 A1 | 11/2007 | Storm |
| 2008/0033776 A1* | 2/2008 | Marchese ............. G06Q 20/10 705/7.33 |
| 2008/0103907 A1* | 5/2008 | Maislos ........... G06F 17/30867 705/14.54 |
| 2010/0192098 A1 | 7/2010 | Kim et al. |
| 2010/0280880 A1 | 11/2010 | Faith et al. |
| 2011/0213651 A1 | 9/2011 | Milana et al. |
| 2011/0246267 A1* | 10/2011 | Williams ............... G06Q 30/02 705/14.4 |
| 2012/0005028 A1* | 1/2012 | Stone ................. G06O 30/0275 705/14.71 |
| 2012/0022945 A1* | 1/2012 | Falkenborg ........ G06Q 30/0255 705/14.53 |
| 2012/0289147 A1 | 11/2012 | Raleigh et al. |
| 2013/0012177 A1 | 1/2013 | Jegal |
| 2014/0365298 A1* | 12/2014 | Tang ...................... G06O 30/02 705/14.48 |
| 2015/0081425 A1* | 3/2015 | Siegman ................ G06Q 30/02 705/14.46 |
| 2015/0206176 A1* | 7/2015 | Toval .................. G06Q 30/0245 705/14.44 |
| 2016/0180386 A1* | 6/2016 | Konig ................ G06Q 30/0255 705/14.55 |
| 2017/0337505 A1* | 11/2017 | Chittilappilly ....... G06Q 10/087 |

OTHER PUBLICATIONS

Finnish Search Report dated Sep. 26, 2014; Application No. 20145233.
International Search Report, dated May 7, 2015, from corresponding PCT application.

* cited by examiner

116A/116B/116C CLASSIFIED WEEKLY CONSUMPTION DATA

300 → , ← 302

| | MON | TUE | WED | THU | FRI | SAT | SUN |
|---|---|---|---|---|---|---|---|
| GROCERIES | 1 | 10 | 2 | 2 | 6 | 3 | 2 |
| PETROL | 0 | 2 | 1 | 3 | 4 | 1 | 1 |
| SPORT EVENT | 0 | 1 | 0 | 1 | 0 | 3 | 1 |
| RESTAURANT | 0 | 0 | 2 | 1 | 3 | 4 | 1 |
| FAST FOOD | 2 | 1 | 0 | 2 | 3 | 3 | 1 |

| | TUE |
|---|---|
| GROCERIES | (10/14)100 = 72% |
| PETROL | (2/14)100 = 14% |
| SPORT EVENT | (1/14)100 = 7% |
| RESTAURANT | (0/14)100 = 0% |
| FAST FOOD | (1/14)100 = 7% |

| | TUE |
|---|---|
| GROCERIES | (12/19)100 = 63% |
| PETROL | (3/19)100 = 16% |
| SPORT EVENT | (1/19)100 = 5% |
| RESTAURANT | (2/19)100 = 11% |
| FAST FOOD | (1/19)100 = 5% |

FIG. 5

|  | 604 ↓ | 606 ↓ | 608 ↓ |
|---|---|---|---|
|  | 33 % | 33% | 33% |
| 600 ↓ | FRI | SAT | SUN ← 602 |
| GROCERIES | 9 = 41% | 2 = 13% | 2 = 33% |
| RESTAURANT | 9 = 41% | 9 = 56% | 1 = 17% |
| FAST FOOD | 3 = 13% | 5 = 31% | 3 = 50% |
| WORK LUNCH | 1 = 5% | 0 = 0% | 0 = 0% |
|  | 22 | 16 | 6 |

FIG. 6

| 600 ↓ | FRI | 700 ↓ |
|---|---|---|
| GROCERIES | (1/3(9/22)+1/3(2/16)+1/3(2/6))100 = 29% | |
| RESTAURANT | (1/3(9/22+1/3(9/16)+1/3(1/6))100 = 38% | |
| FAST FOOD | (1/3(3/22+1/3(5/16)+1/3(3/6))100 = 31.5% | |
| WORK LUNCH | (1/3(1/22+1/3(0/16)+1/3(0/6))100 = 1.5% | |

FIG. 7

|   | 800 ↓ | 802 ↓ 0 | 804 ↓ +1 | 806 ↓ +2 | 808 ↓ +3 |
|---|---|---|---|---|---|
| | MON | 35% | 25% | 20% | 20% |
| | TUE | 40% | 35% | 25% | 10% |
| | WED | 50% | 40% | 10% | 0% |
| | THU | 40% | 30% | 30% | 0% |
| | FRI | 33% | 33% | 33% | 0% |
| | SAT | 60% | 30% | 10% | 0% |
| | SUN | 80% | 10% | 5% | 5% |

FIG. 8

CONTENT SELECTION FOR MOBILE DEVICE

FIELD OF THE INVENTION

The invention relates to a content selection for a mobile device.

BACKGROUND OF THE INVENTION

A user of a mobile device is flooded with information originating from various sources. Futile information wastes valuable resources: wireless data transmission capacity is wasted by transmitting such information, processing resources are wasted both in the mobile device receiving such information as well as in the network side processing and transmitting such information, speed of communication is reduced as the whole communication chain is overloaded, and, finally, the electric power fed from a battery of the mobile device is wasted for receiving and processing such information.

BRIEF DESCRIPTION OF THE INVENTION

According to an aspect of the present invention, there is provided an apparatus comprising one or more processors, and one or more memories including computer program code, the one or more memories and the computer program code configured to, with the one or more processors, cause the apparatus at least to: obtain classified weekly consumption data of a consumer, the classified weekly consumption data comprising daily consumption classes for each day of the week; calculate for each consumption class a relative daily value for each day of the week such that the relative daily value is the sum of the payments in the consumption class during the day in proportion to the sum of the payments in all consumption classes during said day; calculate for each consumption class a content relevance probability in a selected day of the week on the basis of a relative daily value of the selected day of the week affected by a relative daily value of at least one day following the selected day of the week; control a content selection for the consumer on the selected day of the week on the basis of the calculated content relevance probabilities for the selected day; and transmit the selected content to a mobile device of the consumer on the selected day.

According to another aspect of the present invention, there is provided a non-transitory computer readable storage medium comprising computer program code which, when loaded into an apparatus causes the apparatus at least to: obtain classified weekly consumption data of a consumer, the classified weekly consumption data comprising daily consumption classes for each day of the week; calculate for each consumption class a relative daily value for each day of the week such that the relative daily value is the sum of the payments in the consumption class during the day in proportion to the sum of the payments in all consumption classes during said day; calculate for each consumption class a content relevance probability in a selected day of the week on the basis of a relative daily value of the selected day of the week affected by a relative daily value of at least one day following the selected day of the week; control a content selection for the consumer on the selected day of the week on the basis of the calculated content relevance probabilities for the selected day; and transmit the selected content to a mobile device of the consumer on the selected day.

LIST OF DRAWINGS

Example embodiments of the present invention are described below, by way of example only, with reference to the accompanying drawings, in which.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while Figures illustrate various embodiments of apparatuses, they are simplified block diagrams that only show some structures and functional entities. The connections shown in these Figures are logical connections; the actual physical connections may be different. Interfaces between the various elements may be implemented with suitable interface technologies, such as a message interface, a method interface, a sub-routine call interface, a block interface, or any hardware/software means enabling communication between functional sub-units. It is apparent to a person skilled in the art that the described apparatuses may also comprise other functions and structures. It should be appreciated that details of some functions, structures, and the protocols used for communication are irrelevant to the actual invention. Therefore, they need not be discussed in more detail here. Although the apparatuses have been depicted as separate single entities, different parts may be implemented in one or more physical or logical entities.

Figure 1:
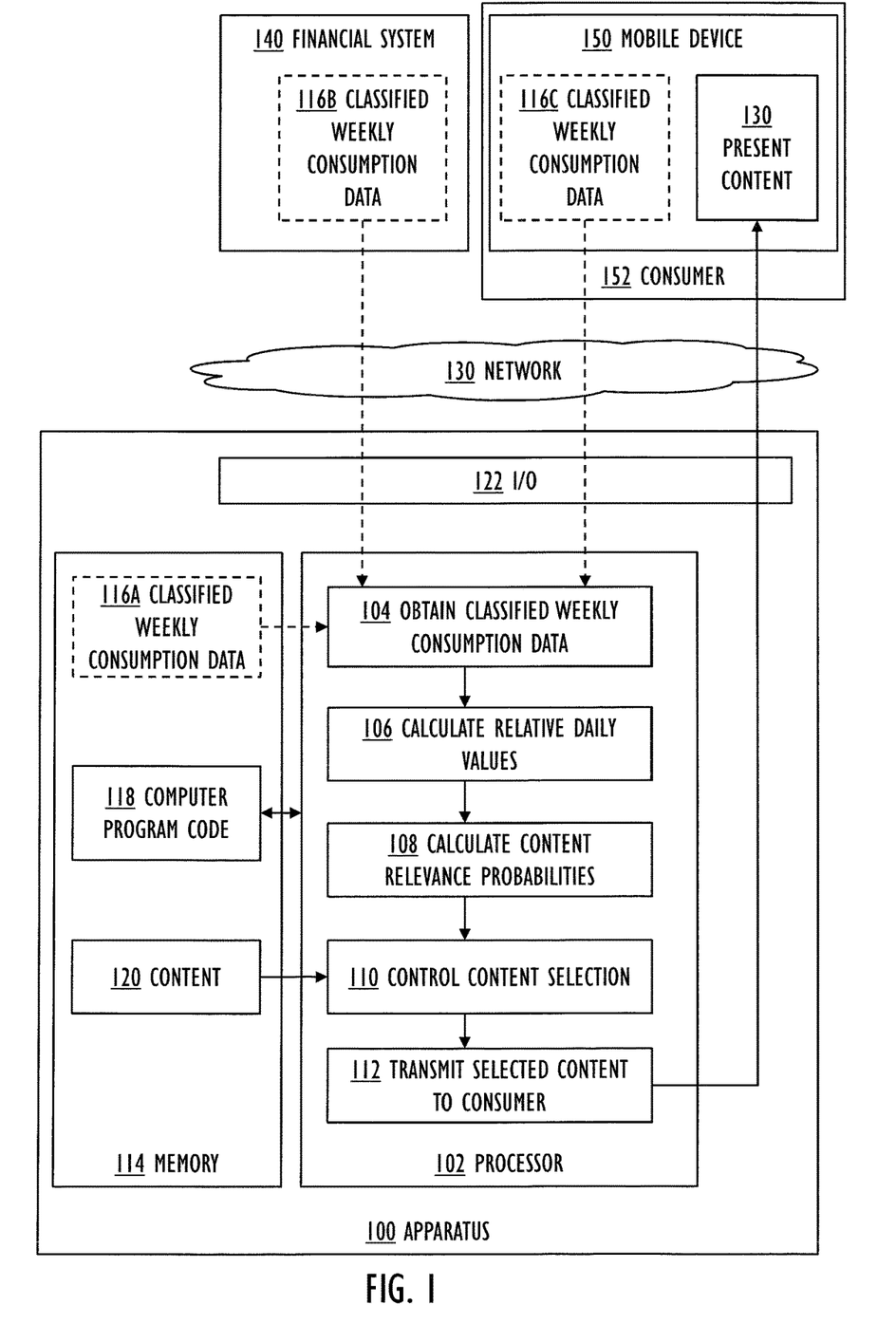
FIGS. 1 and 2 illustrate example embodiments of an apparatus.

FIG. 1 illustrates example embodiments of an apparatus 100 and its general operating environment.

The apparatus 100 comprises one or more processors 102, and one or more memories 114 including computer program code 118.

In an example embodiment, the apparatus 100 comprises a computing resource, which may be implemented as a single server computer or as a cluster of computers. The server 100 is a part of the client-server computing model that acts as distributed application which partitions tasks or workloads between the provider of a resource or service, called server, and the service requester, called client. The server 100 may serve both a mobile device 150 and a system 140. The server computer 100 may be a host that is running one or more server programs which share their resources with clients 150. The client 150 may request a server's 100 content or service function. The client 150 therefore initiates a communication session with the server 100 which awaits incoming requests.

The computing resource 100 may also operate according to the cloud computing model. Naturally, besides these example embodiments of the computing resource 100 other feasible computing architectures may be utilized as well to implement the hardware and software of the computing resource 100. Consequently, besides operating according to the client/server architecture, push technology may be utilized as well. In push technology, the request for a transaction is initiated by the server 100, whereas with the pull technology the request for the information is initiated by the client 150.

In an example embodiment, the term 'processor' 102 refers to a physical device that is capable of processing data in a computer or other digital electronic device. Depending on the processing power needed, the apparatus 100 may comprise several processors 102 such as parallel processors or one or more multicore processors. A non-exhaustive list of implementation techniques for the processor 102 includes, but is not limited to: logic components, standard integrated circuits, application-specific integrated circuits (ASIC), system-on-a-chip (SoC), application-specific standard products (ASSP), microprocessors, digital signal processors, special-purpose computer chips, and field-programmable gate arrays (FPGA).

In an example embodiment, the term 'memory' 114 refers to a physical device that is capable of storing the computer program code 118 and data 116A, 120 on a temporary or permanent basis for use in a computer or other digital electronic device. In an example embodiment, the term 'memory' refers to working memory (also known as primary storage, main memory or internal storage) directly accessible to the processor 102. In an example embodiment, the working memory may be implemented as a random-access memory (RAM), such as a dynamic RAM, DRAM.

Figure 2:
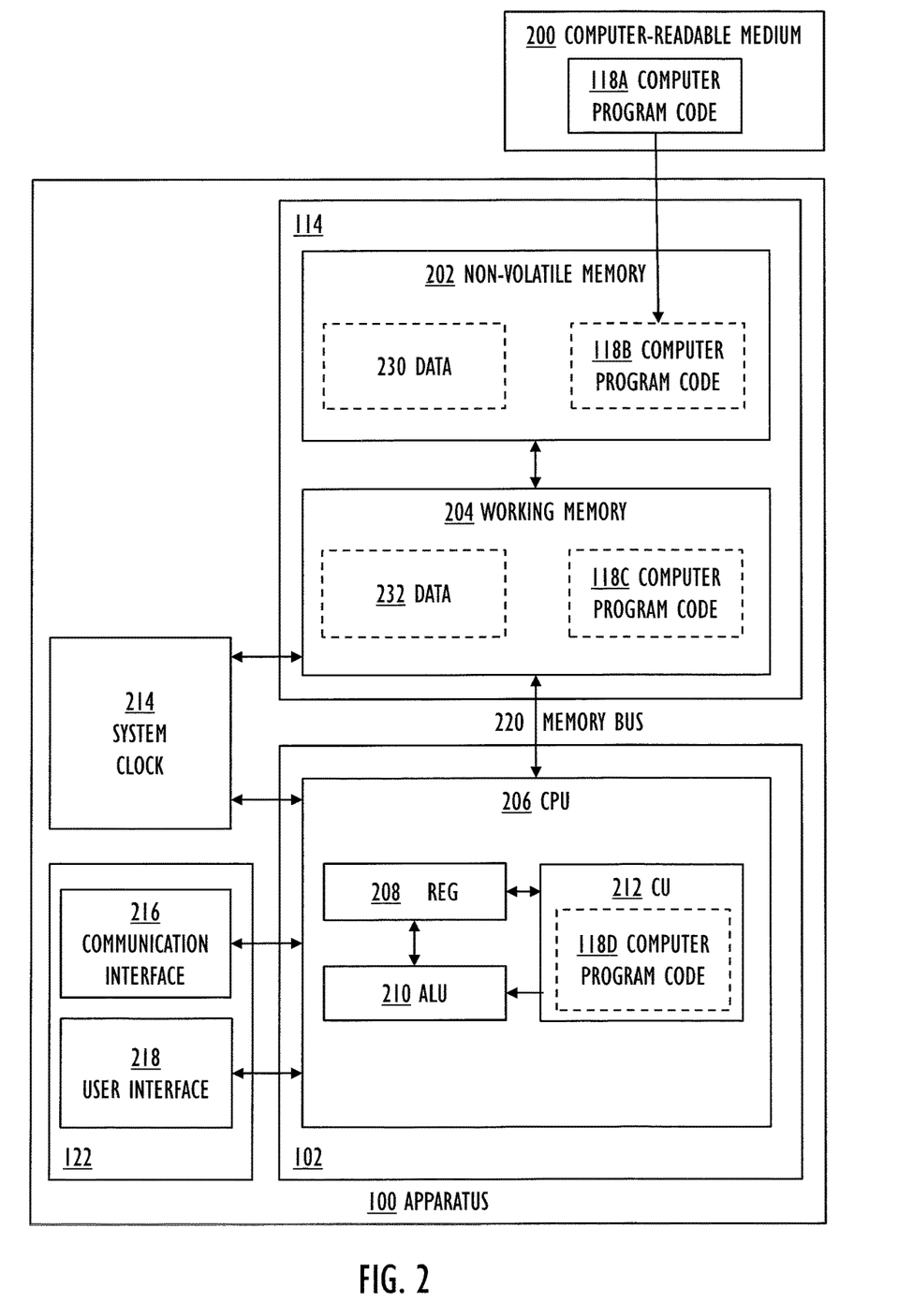

Let us next study FIG. 2 illustrating an example embodiment of the apparatus 100. The apparatus 100 may include an electronic digital computer, which may comprise a non-volatile memory 202 and a working memory 204 as the memory 114, the processor 102, a system clock 214 and an input/output 122 including a user interface 218 and a data communication interface 216. Naturally, the computer may comprise a number of other peripheral devices, not illustrated here for the sake of clarity. Also, the architecture of FIG. 2 is just one example embodiment as other feasible computing architectures may be utilized as well to implement the hardware and software of the apparatus 100. It is also to be noted that the architecture of FIG. 2 may be applied as well, changing those things which need to be changed, to the implementation of the mobile device 150 including computer functionalities.

In an example embodiment, the system clock 214 constantly generates a stream of electrical pulses, which cause the various transferring operations within the computer to take place in an orderly manner and with specific timing.

In an example embodiment, the processor 102 may be implemented as a microprocessor implementing functions of a central processing unit (CPU) 206 on an integrated circuit. The CPU 206 is a logic machine executing the computer program code 118D. The computer program code 118A/118B/118C/118D may be coded as a computer program using a programming language, which may be a high-level programming language, such as C, C++, or Java, or a low-level programming language, such as a machine language, or an assembler. There are many ways to structure the computer program code 118A/118B/118C/118D. In an example embodiment, the operations of the computer program code 118A/118B/118C/118D may be divided into functional modules, sub-routines, methods, classes, objects, applets, macros, etc., depending on the software design methodology and the programming language used. In modern programming environments, there are software libraries, i.e. compilations of ready-made functions, which may be utilized by the computer program code 118A/118B/118C/118D for performing a wide variety of standard operations.

The CPU 206 may comprise a set of registers 208, an arithmetic logic unit (ALU) 210, and a control unit (CU) 212. The control unit 212 is controlled by the computer program code 118D transferred to the CPU 206 from the working memory 204. The working memory 204 is directly or indirectly connected to the CPU 206 via a memory bus 220 including two buses: an address bus and a data bus. The CPU 206 sends a memory address indicating the desired location of data 232 or computer program code 118C through the address bus, whereupon the CPU 206 reads or writes the data itself from/to the working memory 204 using the data bus.

The control unit 212 may contain a number of microinstructions for basic operations. The implementation of the microinstructions may vary, depending on the CPU design. The microprocessor 206 may also have an operating system (such as a general-purpose operating system), which may provide the computer program code 118D with system services. During running of the computer program code 118D, the computer program code 118C or a part of it are transferred via the memory bus 220 from the working memory 204 into the control unit 212, wherein usually a portion of the computer program code 118D resides and controls the operation.

In an example embodiment, the non-volatile memory 202 retains the stored information even when not powered. Examples of non-volatile memory include read-only memory (ROM), flash memory, magnetic computer storage devices such as hard disk drives, and optical discs. As is shown in FIG. 2, the non-volatile memory 202 may store both data 230 and the computer program code 118B.

An example embodiment illustrated in FIG. 2 provides a computer-readable medium 200 comprising the computer program code 118A. Said computer program code 118A, when executed on the apparatus 100, causes the apparatus 100 to perform the operations required to implement the described example embodiments. In an example embodiment, the computer program code 118A may be in source code form, object code form, or in some intermediate form. The computer-readable medium 200 may comprise at least the following: any entity or device capable of carrying computer program code 118A to the apparatus 100, a record medium, a computer memory, a read-only memory, an electrical carrier signal, a telecommunications signal, and a software distribution medium. In some jurisdictions, depending on the legislation and the patent practice, the computer-readable medium 200 may not be the telecommunications signal. In an example embodiment, the computer-readable medium 200 may be a non-transitory computer readable storage medium.

Now that the basic structure of the apparatus 100 has been described, we may proceed in describing the operation of the apparatus 100 in more detail with reference to FIGS. 2, 3, 4, 5, 6, 7 and 8.

The one or more memories 114 and the computer program code 118 are configured to, with the one or more processors 102, cause the apparatus 100 to obtain 104 classified weekly consumption data 116A, 116B, 116C of a consumer 152, the classified weekly consumption data 116A, 116B, 116C comprising daily consumption classes for each day of the week.

Figure 3:
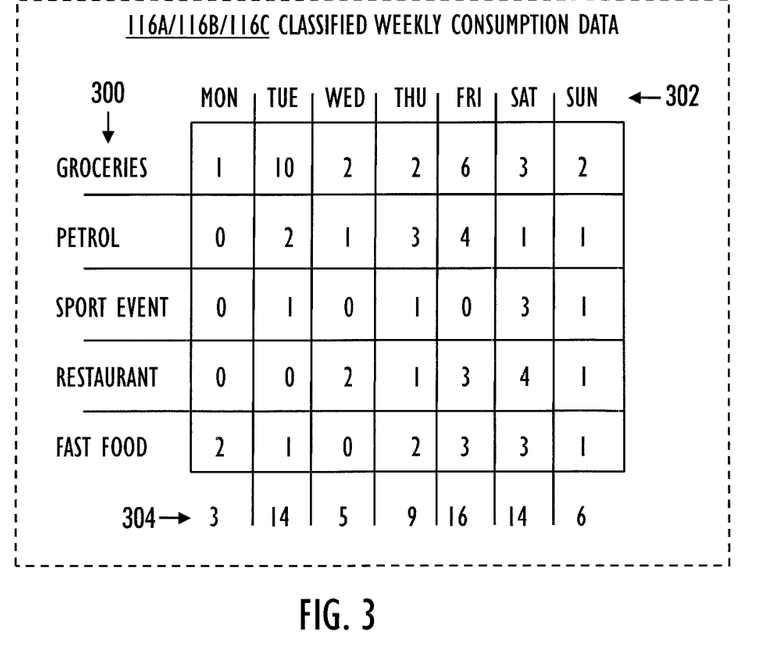
FIGS. 3, 4, 5, 6, 7 and 8 illustrate example embodiments of a content selection.

FIG. 3 illustrates an example embodiment of the classified weekly consumption data 116A, 116B, 116C. The daily consumption classes 300 are shown on the rows: groceries, petrol, sport event, restaurant, fast food, whereas the days of the week 302 are shown on the columns, and the summary information 304 for each day of the week is shown on the bottom.

The daily consumption classes reflect the consumption habits of the consumer 152.

In an example embodiment, the consumption classes 300 comprise at least one of the following types of information: commodity classes, lines of business, merchant category codes, tags determined by the consumer and/or by the service provider operating the apparatus 100.

The commodity class may determine the commodity with a chosen granularity: car, home, garden, groceries etc. Accordingly, the line of business may determine the commodity by its provider: car repair shop, furniture shop, garden centre, grocery, etc. The merchant category code (MCC) is a four-digit number, assigned to a business by credit card companies, and used to classify the business by the type of goods or services it provides: 5691 may refer to men's and women's clothing stores, for example. The term "tag" refers to metadata, i.e., "data about data". In an example embodiment the tag comprises a keyword or a term or a similar expression(s) comprising symbols such as words, abbreviations, codes, letters, numerals, and/or characters.

Applicant's co-pending patent application FI 20136241 discloses example embodiments related to tagging, and the resulting classified consumption data.

By studying the classified weekly consumption data 116A, 116B, 116C of FIG. 3 we may observe, for example, that the consumer 152 consumed ten units for groceries, two units for petrol, one unit for sport event and one unit for fast food on Tuesday. In an example embodiment, the units may be expressed as numerals whose magnitudes represent the relative differences between the consumption classes. In an example embodiment, the units are expressed as points, monetary sums or the like.

As shown in FIG. 1, the classified weekly consumption data may originate from any one of the three sources, or from any combination of two or three sources: the classified weekly consumption data 116A may be maintained in the apparatus 100 itself, the classified weekly consumption data 116B may partly or wholly be generated in a financial system 140, and/or the classified weekly consumption data 116C may be partly or wholly generated and/or maintained in the mobile device 150 of the consumer 152.

The financial system 140 may be operated by a financial institution, such as a bank. The financial system 140 may comprise several systems, such as systems of the routing and/or acquiring and or issuing bank. The apparatus 100 may be operated by a service provider such as an application service provider, which provides the computer-based service with Internet hosting for the consumers 152. In an example embodiment, the service provider is the applicant, OP-Pohjola Group, or some other financial institution. It is also to be noted that the integration grade between the apparatus 100 and the financial system 140 may vary: every element may be a separate actor, or one or more elements may be combined to a multi-actor element.

In an example embodiment, the classified weekly consumption data 116A, 116B, 116C is based on payments of trades of various commodities during at least one week. A trade between the consumer 152 and a seller transfers the ownership of the commodity from the seller to the consumer 152, and the seller gets a payment in exchange. The commodity is any marketable item produced to satisfy wants or needs, and the commodity comprises (consumer) goods and services.

In an example embodiment, a payment card may be used by the consumer 152 and accepted by the seller to make payments for the trade. In an example embodiment, the payment card may be a credit card or a debit (or bank) card, or any other suitable payment medium, for example. In an example embodiment, the payment card may be implemented as a magnetic stripe card, smart card, or a proximity card, or with any other suitable technology, for example.

In an example embodiment, the classified weekly consumption data 116A, 116B, 116C is based on payments of trades of various commodities during a fortnight, four weeks, eight weeks, twelve weeks, one month, two months, three months, six months, or one year. In an example embodiment, a sliding window with any of the mentioned lengths may be used to gather the classified weekly consumption data 116A, 116B, 116C.

The one or more memories 114 and the computer program code 118 are configured to, with the one or more processors 102, cause the apparatus 100 to calculate 106 for each consumption class a relative daily value for each day of the week 302 such that the relative daily value is the sum of the payments in the consumption class during the day in proportion to the sum of the payments in all consumption classes during said day.

In an example embodiment, each daily consumption class includes payments of trades of commodities belonging to the daily consumption class.

Figure 4:
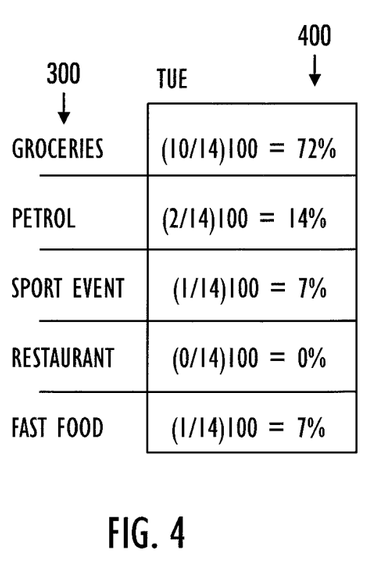

FIG. 4 illustrates an example embodiment for Tuesday: for each consumption class 300 a relative daily value is calculated. In this example embodiment for each consumption class 300 the relative daily value 400 is expressed as percentages. For example, the value for the consumption class "Petrol" is obtained by the following calculation: $2/14*100=14.2857\%$, which is rounded to 14%. Naturally, besides percentages also other ways of expressing relative values comparable to each other may be utilized for the relative daily values 400. Consequently, the relative daily values 400 may be expressed as ratios, for example.

The one or more memories 114 and the computer program code 118 are configured to, with the one or more processors 102, cause the apparatus 100 to calculate 108 for each consumption class 300 a content relevance probability in a selected day of the week on the basis of a relative daily value of the selected day of the week affected by a relative daily value of at least one day following the selected day of the week.

Figure 5:
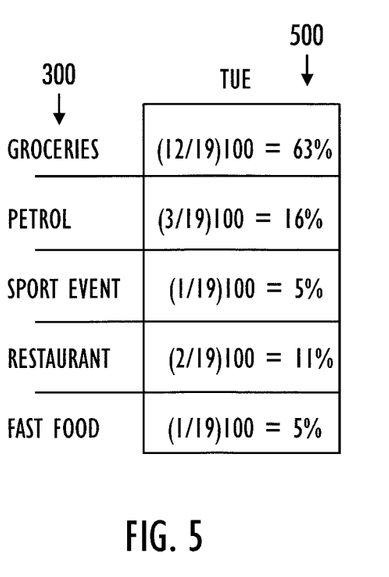

FIG. 5 illustrates an example embodiment for Tuesday: the relative daily value of Tuesday is affected by the relative daily value of Wednesday. For example the value for the consumption "Petrol" is now $3/19*100\%=15.7895\%$, which is rounded to 16%. In this way, a more precise content relevance probability may be obtained as also the following day(s) have on influence on the consumer's 152 interests. Ultimately, with the described processing, accurate predictions on the consuming habits of the consumer 152 may be produced. This brings forth more precise selection of the content, which, in turn, results in numerous advantages as the wasting of the valuable resources is prohibited: wireless data transmission capacity is saved by transmitting relevant information, processing resources are saved both in the mobile device 150 receiving the information as well as in the network side 100, 130 processing and transmitting the information, speed of communication is increased as the whole communication chain is utilized effectively without overloading it, and, finally, the electric power fed from a battery of the mobile device 150 is save as only relevant information is received and processed.

In an example embodiment, the selected day and the at least one day following the selected day of the week comprises at least one of the following combinations:

Monday as the selected day, and Tuesday as the at least one day following the selected day of the week;

Monday as the selected day, and Tuesday and Wednesday as the at least one day following the selected day of the week;

Monday as the selected day, and Tuesday, Wednesday and Thursday as the at least one day following the selected day of the week;

Tuesday as the selected day, and Wednesday as the at least one day following the selected day of the week;

Tuesday as the selected day, and Wednesday and Thursday as the at least one day following the selected day of the week;

Wednesday as the selected day, and Thursday as the at least one day following the selected day of the week;

Friday as the selected day, and Saturday as the at least one day following the selected day of the week;

Friday as the selected day, and Saturday and Sunday as the at least one day following the selected day of the week;

Saturday as the selected day, and Sunday as the at least one day following the selected day of the week;

Sunday as the selected day, and Monday as the at least one day following the selected day of the week;

Sunday as the selected day, and Monday and Tuesday as the at least one day following the selected day of the week;

Sunday as the selected day, and Monday, Tuesday and Wednesday as the at least one day following the selected day of the week;

Sunday as the selected day, and Monday, Tuesday, Wednesday and Thursday as the at least one day following the selected day of the week.

The one or more memories 114 and the computer program code 118 are configured to, with the one or more processors 102, cause the apparatus 100 to control 110 a content 120 selection for the consumer 152 on the selected day of the week on the basis of the calculated content relevance probabilities for the selected day. If we check FIG. 5, we will see that the most interesting content 120 for the consumer 152 on Tuesday relates to "Groceries" (63%), followed by the "Petrol" (16%) and "Restaurant" (11%). Consequently, the more interesting content 120 will more likely be selected. The selection may be based on a mathematical algorithm favouring the more relevant content 120. However, the selection may also be influenced by further factors, such as financial compensation offered by the content 120 providers for the service provide operating the apparatus 100.

The term 'content' refers to information providing value for the consumer 152. In other words, 'content' identifies and quantifies information as a manageable value-adding component of useful media to the consumer 152. Note that 'content' refers to the content of the medium (used to carry the content) rather than the medium itself. In an example embodiment, the content 120 comprises information on at least one of the following: services, brands, offers, advertisement, vouchers, coupons, social media updates. As shown in FIG. 1, the apparatus 100 may store content 120 in the memory 114, but, alternatively or additionally, the apparatus 100 may obtain the content 120 from some external source, such as from a data system of the content 120 provider.

In an example embodiment, the one or more memories 114 and the computer program code 118 are further configured to, with the one or more processors 102, cause the apparatus 100 further to control 110 the content 120 selection for the consumer 152 on the selected day of the week on the basis of the calculated content relevance probabilities for the selected day such that each content item of the content 120 is classified to at least one consumption class, and a content item classified to a consumption class with a higher content relevance probability is favoured over a content item classified to a consumption class with a lower content relevance probability than the higher content relevance probability. In this way, the content 120 may comprise a plurality of content items.

In an example embodiment, the one or more memories 114 and the computer program code 118 are further configured to, with the one or more processors 102, cause the apparatus 100 further to control 110 the content 120 selection for the consumer 152 on the selected day of the week on the basis of the calculated content relevance probabilities for the selected day such that demographic information of the consumer 152 further influences the content 120 selection such that the content item matching the demographic information of the consumer 152 is favoured in the content 120 selection. The demographic information of the consumer 152 may comprise at least one of the following: gender, age, ethnicity, knowledge of languages, disabilities, mobility, home ownership, employment status, location. For example, in the example embodiment of FIG. 5, as the content 120 is selected for the consumer 152 relating to "Groceries", the location of the consumer 152 is taken into account while selecting advertisement of a nearby grocer's as the content 120.

In an example embodiment, the one or more memories 114 and the computer program code 118 are further configured to, with the one or more processors 102, cause the apparatus 100 further to obtain brand loyalty ranking information of the consumer 152, and control 110 the content 120 selection for the consumer 152 on the selected day of the week on the basis of the calculated content relevance probabilities for the selected day such that each content item of the content is classified to at least one brand, and the brand loyalty ranking information of the consumer 152 further influences the content 120 selection such that the content item with a higher brand loyalty rank is favoured over a content item with a lower brand loyalty rank than the higher brand loyalty rank. The term 'brand' refers to the name, term, design, symbol, or any other feature that identifies one seller's product distinct from those of other sellers. In the present context, the 'brand' identifies the seller or various commodities by their manufacturer or marketer. Consequently, if the consumer 152 has favoured certain brands in the past, it is supposed that the content 120 relating to these favoured brands is more relevant than the content 120 that is unknown to the consumer 152 or rarely purchased by the consumer 152. The one or more memories 114 and the computer program code 118 are configured to, with the one or more processors 102, cause the apparatus 100 to transmit 112 the selected content to a mobile device 150 of the consumer 152 on the selected day. In FIG. 5, for example, the consumer 152 will receive content relating to the "Groceries". Depending on the selected strategy, content relating to "Petrol" may also be transmitted 112. Furthermore, also "Restaurant", "Sport Event" and/or "Fast Food" content may be transmitted 112. As shown in FIG. 1, the mobile device 150 of the consumer 152 is capable of presenting 130 the selected content 120, in a user interface of the mobile device 150, for example.

In an example embodiment, the mobile device 150 is a portable electronic communication apparatus. A non-exhaustive list of the types of the mobile device 150 includes: a mobile phone, a smartphone, a tablet computer, a laptop, a general-purpose mobile computing device. In an example embodiment, the mobile device 150 is a general-purpose off-the-shelf computing device, as opposed to a purpose-build proprietary equipment, whereby research & development costs will be lower as only the special-purpose software (and not the hardware) needs to be designed, implemented and tested. In an example embodiment, the mobile device 150 is a smartphone or a tablet employing a multi-touch display and a suitable operating system such as iOS, Android, or Windows Phone, for example.

The mobile device 150 comprises the user interface, a wireless transceiver, one or more processors, and one or more memories including computer program code.

In an example embodiment, the wireless transceiver may be interoperable with various wireless standard/non-standard/proprietary communication networks such as any mobile phone network, regardless of the generation (such as 2G, 3G, 4G, beyond 4G, etc.) such as GSM (Global System for Mobile Communications), GPRS (General Packet Radio Service), EGPRS (Enhanced GPRS), WCDMA (Wideband Code Division Multiple Access), UMTS (Universal Mobile Telephone System), 3GPP (The 3rd Generation Partnership Project), IMT (International Mobile Telecommunication), LTE (Long Term Evolution, LTE-A (LTE-Advanced), and other radio systems (in their present forms and/or in their evolution forms), such as WLAN (Wireless Local Area Network) based on IEEE (Institute of Electrical and Electronics Engineers) 802.11 standard or its evolution versions (IEEE 802.11ac etc.), WiMAX (Worldwide Interoperability for Microwave Access, or Wi-Fi, for example.

In an example embodiment, the wireless transceiver, while communicating with a mobile phone network 130, may require a subscriber identity module (SIM), which may be an integrated circuit storing subscriber 152 data, which is network-specific information used to authenticate and identify the subscriber 152 on the cellular network 130. The subscriber identity module may be embedded into a removable SIM card, on a mini-SIM card, for example. Furthermore, the mobile apparatus 104 may include a SIM card reader, for example. Besides being implemented on a SIM card, the subscriber identity module may be implemented with other techniques as well, such as a virtual/embedded SIM.

In an example embodiment, the user interface implements the exchange of graphical, textual and auditory information with the consumer 152. The user interface may be realized with various techniques, such as a display, means for producing sound, a keyboard, and/or a keypad, for example. The display may be a liquid crystal display, for example, but it may also be implemented by any appropriate technique, such as with an active-matrix organic light-emitting diode. The display may also incorporate other user interaction means, such as touch input, or haptic feedback, i.e. the display may be a multi-touch display. The means for producing sound may be a loudspeaker or a simpler means for producing beeps or other sound signals. The keyboard/keypad may comprise a complete (QWERTY) keyboard, a mere numeric keypad or only a few push buttons and/or rotary buttons. In addition, the user interface may comprise other user interface components, for example various means for focusing a cursor (mouse, track ball, arrow keys, touch sensitive area etc.) or elements enabling audio control.

Naturally, the mobile device 150 may include various other parts, such as a battery, a camera, a radio-frequency identifier reader, a positioning receiver, but as they are not needed to further illustrate the example embodiments, they will not be further described.

In an example embodiment, the one or more memories 114 and the computer program code 118 are further configured to, with the one or more processors 102, cause the apparatus 100 further to calculate 108 for each consumption class the content relevance probability in the selected day of the week on the basis of the relative daily value of the selected day of the week affected by the relative daily value of the at least one day following the selected day of the week such that the relative daily value of the selected day of the week is multiplied by a first weighting coefficient and summed up with the relative daily value of the at least one following day of the week multiplied by at least one further weighting coefficient.

Figure 6:
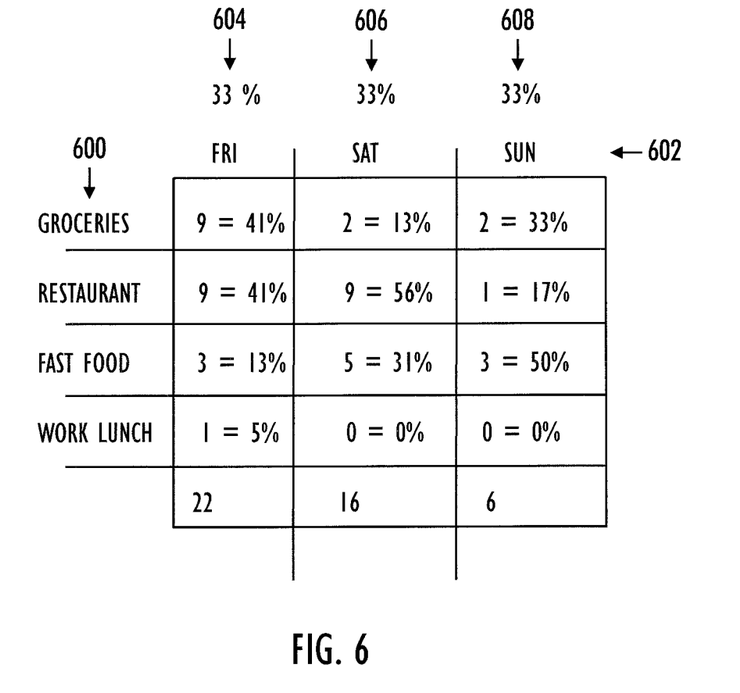

FIG. 6 illustrates an example embodiment of the content relevance calculation: for the consumption classes 600 "Groceries", "Restaurant", Fast Food" and "Work Lunch" the content relevance probabilities are calculated separately for three days 602, Friday, Saturday and Sunday.

Figure 7:
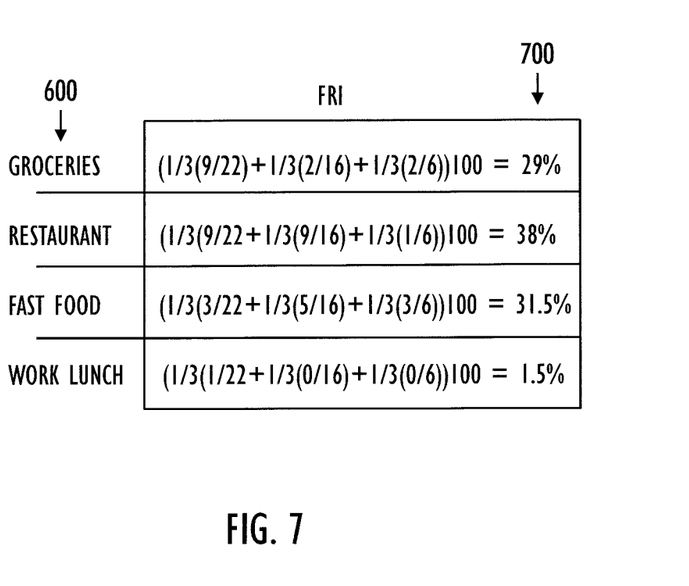

FIG. 7 illustrates an example embodiment utilizing the weighting coefficients. As shown in FIG. 6, there are three weighting coefficients: 33% (or ⅓) 604 for Friday, 33% (or ⅓) 606 for Saturday and 33% (or ⅓) 608 for Sunday. Now, as illustrated in FIG. 7, for each consumption class the content relevance probability 700 in Friday is calculated on the basis of the relative daily value of Friday affected by the relative daily values of Saturday and Sunday such that the relative daily value of Friday is multiplied by ⅓ and summed up with the relative daily values of Saturday multiplied by ⅓ and Sunday multiplied by ⅓. For example: consumption class "Groceries" obtains the content relevance probability with the following calculation: $(⅓*(9/22)+⅓*(2/16)+⅓*(⅖))*100\%=29\%$.

Figure 8:
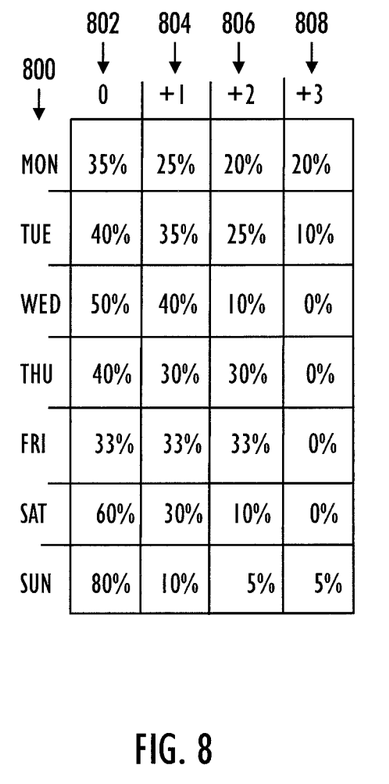

FIG. 8 illustrates an example embodiment with different weighting coefficients for each day of the week 800. For example, if the selected day of the week is Monday, then the first weighting coefficient 802 is 35%, the second weighting coefficient 804 is 25%, the third weighting coefficient 806 is 20%, and the fourth weighting coefficient 808 is 20%. Another example, already explained above with reference to FIGS. 6 and 7, gives for the selected day of the week being Friday, the first weighting coefficient 802 33%, the second weighting coefficient 804 33%, the third weighting coefficient 806 33%, and the fourth weighting coefficient 808 0%.

The example embodiments described so far deal with content relevance probabilities based on consumption examined at a minimum granularity level of one day. However, in an example embodiment, the one or more memories 114 and the computer program code 118 are further configured to, with the one or more processors 102, cause the apparatus 100 further to divide the selected day into parts, control 110 the content 120 selection for the consumer 152 on the selected day of the week on the basis of the calculated content relevance probabilities for the selected day such that each content item of the content 120 is classified to at least one part of the day, and each selected content item is assigned for at least one part of the selected day, and transmit 112 the selected content 120 to the mobile device 150 of the consumer 152 on the selected day such that each selected content item is transmitted during the at least one assigned part of the selected day. In this way, the granularity may be even finer, hour-by-hour, for example, or in special cases even more specific than that, ultimately maybe even minute-by-minute. Let us suppose that the consumer 152 usually leaves work at 16:00 on Friday. Before s/he leaves, the mobile device 150 is provided content 120 relating to the Groceries. Later, at 18:00, for example, the mobile device 150 is provided content 120 relating to weekend activities: about movies, theatre etc. or fine dining, for example. At 22:00, the mobile device may 150 provide content 120 about an art exhibition on Saturday, for example. Note that demographic information and/or brand loyalty ranking information may further affect the calculated content relevance probabilities: a certain supermarket may be favoured in the content relating to the Groceries, for example.

It will be obvious to a person skilled in the art that, as technology advances, the inventive concept can be implemented in various ways. The invention and its embodiments are not limited to the example embodiments described above but may vary within the scope of the claims.

The invention claimed is:

1. A server computer apparatus configured to provide content selection for a mobile device, the server computer apparatus comprising:
   one or more processors; and
   one or more memories including computer program code, the one or more memories and the computer program code configured to, with the one or more processors, cause the apparatus at least to:
      obtain classified weekly spending data of a consumer, the classified weekly spending data comprising daily spending classes for each day of the week,
      calculate for each spending class a relative daily value for each day of the week such that the relative daily value is the sum of the payments in the spending class during the day in proportion to the sum of the payments in all spending classes during said day,
      calculate for each spending class a content relevance probability in a selected day of the week based on a sum of a relative daily value of the selected day of the week and a relative daily value of at least one day following the selected day of the week,
      control a content selection for the consumer on the selected day of the week based on the calculated content relevance probabilities for the selected day, and
      transmit wirelessly the selected content to the mobile device of the consumer on the selected day in a subsequent week after the classified weekly spending data is obtained,
   wherein the selected content comprises information on at least one of the following: services, brands, offers, advertisements, vouchers, coupons, and social media updates.

2. The apparatus of claim 1, wherein the classified weekly spending data is based on payments of trades of various commodities during at least one week.

3. The apparatus of claim 1, wherein the classified weekly spending data is based on payments of trades of various commodities during a fortnight, four weeks, eight weeks, twelve weeks, one month, two months, three months, six months, or one year.

4. The apparatus of claim 1, wherein each daily spending class includes payments of trades of commodities belonging to the daily consumption class.

5. The apparatus of claim 1, wherein the at least one day following the selected day of the week comprises at least one of the following: two days, three days, four days, five days, and six days.

6. The apparatus of claim 1, wherein the selected day and the at least one day following the selected day of the week comprises at least one of the following combinations:
   Monday as the selected day, and Tuesday as the at least one day following the selected day of the week,
   Monday as the selected day, and Tuesday and Wednesday as the at least one day following the selected day of the week,
   Monday as the selected day, and Tuesday, Wednesday and Thursday as the at least one day following the selected day of the week,
   Tuesday as the selected day, and Wednesday as the at least one day following the selected day of the week,
   Tuesday as the selected day, and Wednesday and Thursday as the at least one day following the selected day of the week,
   Wednesday as the selected day, and Thursday as the at least one day following the selected day of the week,
   Friday as the selected day, and Saturday as the at least one day following the selected day of the week,
   Friday as the selected day, and Saturday and Sunday as the at least one day following the selected day of the week,
   Saturday as the selected day, and Sunday as the at least one day following the selected day of the week,
   Sunday as the selected day, and Monday as the at least one day following the selected day of the week,
   Sunday as the selected day, and Monday and Tuesday as the at least one day following the selected day of the week,
   Sunday as the selected day, and Monday, Tuesday and Wednesday as the at least one day following the selected day of the week, and
   Sunday as the selected day, and Monday, Tuesday, Wednesday and Thursday as the at least one day following the selected day of the week.

7. The apparatus of claim 1, wherein the one or more memories and the computer program code are further configured to, with the one or more processors, cause the apparatus further to:
   calculate for each spending class the content relevance probability in the selected day of the week based on the sum of the relative daily value of the selected day of the week and the relative daily value of the at least one day following the selected day of the week such that the relative daily value of the selected day of the week is multiplied by a first weighting coefficient and summed up with the relative daily value of the at least one following day of the week multiplied by at least one further weighting coefficient.

8. The apparatus of claim 1, wherein the one or more memories and the computer program code are further configured to, with the one or more processors, cause the apparatus further to:
   control the content selection for the consumer on the selected day of the week based on the calculated content relevance probabilities for the selected day such that each content item of the content is classified to at least one spending class, and a content item classified to a spending class with a higher content relevance probability is favored over a content item classified to a spending class with a lower content relevance probability than the higher content relevance probability.

9. The apparatus of claim 8, wherein the one or more memories and the computer program code are further configured to, with the one or more processors, cause the apparatus further to:
control the content selection for the consumer on the selected day of the week based on the calculated content relevance probabilities for the selected day such that demographic information of the consumer further influences the content selection such that the content item matching the demographic information of the consumer is favored in the content selection.

10. The apparatus of claim 8, wherein the one or more memories and the computer program code are further configured to, with the one or more processors, cause the apparatus further to:
obtain brand loyalty ranking information of the consumer; and
control the content selection for the consumer on the selected day of the week based on the calculated content relevance probabilities for the selected day such that each content item of the content is classified to at least one brand, and the brand loyalty ranking information of the consumer further influences the content selection such that the content item with a higher brand loyalty rank is favored over a content item with a lower brand loyalty rank than the higher brand loyalty rank.

11. The apparatus of claim 8, wherein the one or more memories and the computer program code are further configured to, with the one or more processors, cause the apparatus further to:
divide the selected day into parts;
control the content selection for the consumer on the selected day of the week based on the calculated content relevance probabilities for the selected day such that each content item of the content is classified to at least one part of the day, and each selected content item is assigned for at least one part of the selected day; and
transmit the selected content to the mobile device of the consumer on the selected day such that each selected content item is transmitted during the at least one assigned part of the selected day.

12. A non-transitory computer readable storage medium comprising computer program code configured to provide content selection for a mobile device, the computer program code, when loaded into a server computer apparatus, causes the apparatus at least to:
obtain classified weekly spending data of a consumer, the classified weekly spending data comprising daily spending classes for each day of the week;
calculate for each spending class a relative daily value for each day of the week such that the relative daily value is the sum of the payments in the spending class during the day in proportion to the sum of the payments in all spending classes during said day;
calculate for each spending class a content relevance probability in a selected day of the week based on a sum of a relative daily value of the selected day of the week and a relative daily value of at least one day following the selected day of the week;
control a content selection for the consumer on the selected day of the week based on the calculated content relevance probabilities for the selected day; and
transmit wirelessly the selected content to the mobile device of the consumer on the selected day in a subsequent week after the classified weekly spending data is obtained,
wherein the selected content comprises information on at least one of the following: services, brands, offers, advertisements, vouchers, coupons, and social media updates.

* * * * *